July 4, 1961 T. R. JAMES 2,990,677
INSTRUMENT DRIVE
Filed Feb. 28, 1958 2 Sheets-Sheet 1
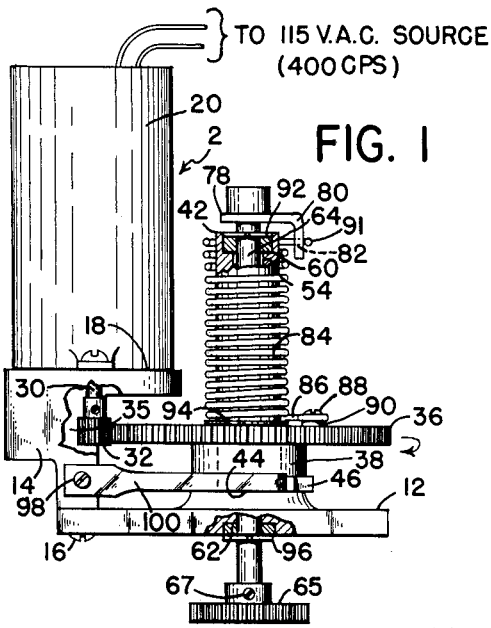
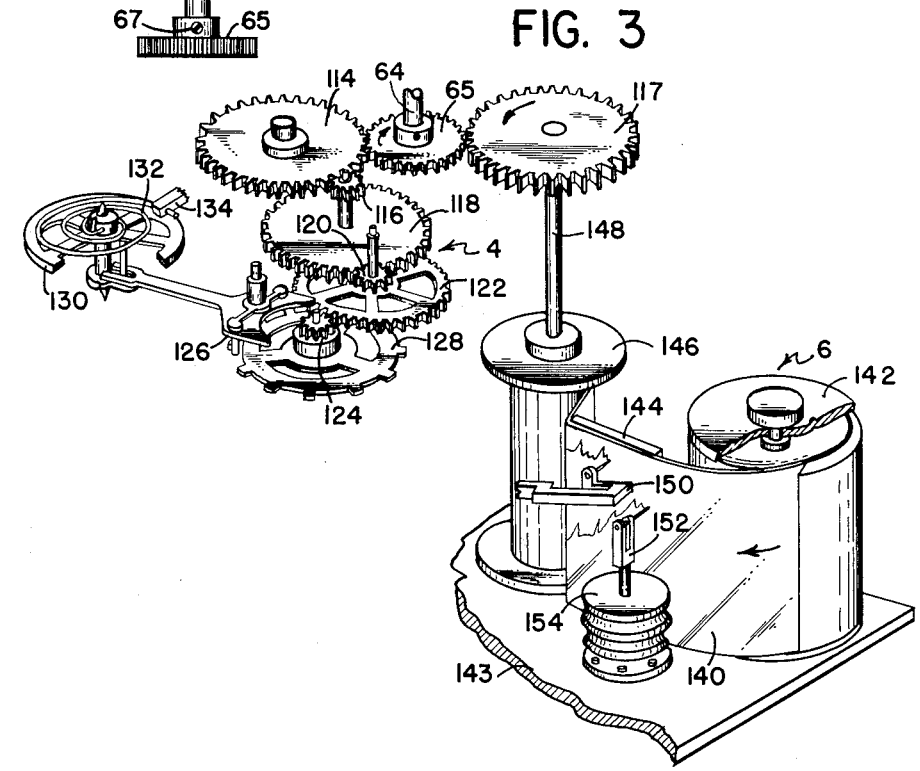
INVENTOR.
THOMAS R. JAMES
BY Robert E. Howe
ATTORNEY

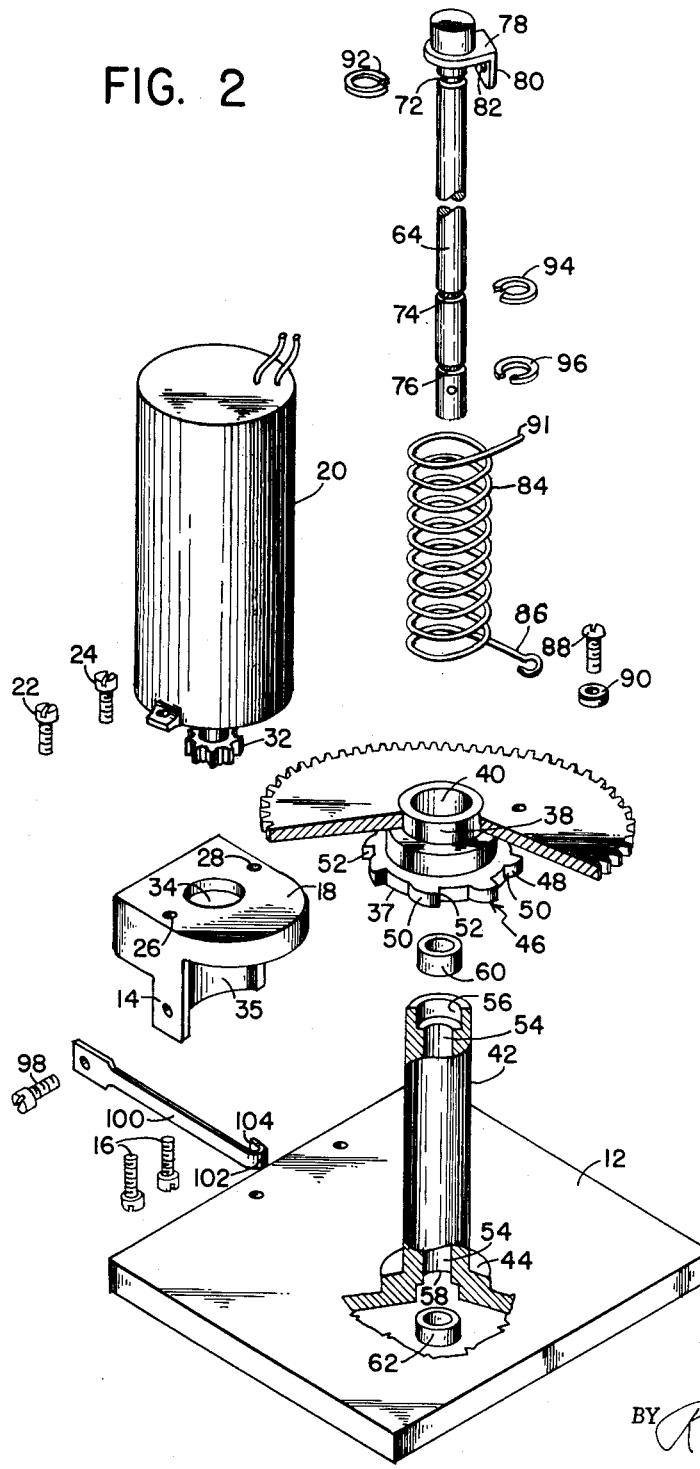

United States Patent Office 2,990,677
Patented July 4, 1961

---

2,990,677
INSTRUMENT DRIVE
Thomas R. James, St. Paul, Minn., assignor to General Mills, Inc., a corporation of Delaware
Filed Feb. 28, 1958, Ser. No. 718,272
2 Claims. (Cl. 58—41)

This invention relates generally to a constant speed instrument drive at a governed rate over a range of voltage or driving force variation, and more particularly to a spring means for accomplishing same, with said spring means also furnishing the driving force in the event of failure of electrical power.

Recording instruments are often driven by electric motors and it is usually important that the recorders be driven at a constant speed. However, as voltage fluctuations may occur the torque applied to the recorder is not always constant.

For example in an aircraft flight recorder operated on a 28 volt or 115 volt A.C. system, there may be voltage fluctuations caused by various electrical loads which affect the rate at which the recorders are driven and therefore inaccuracies occur particularly as to time.

Further speed control for a recorder over a reasonable range of force may be obtained by a clock escapement mechanism. If, however, the drive force exceeds the limits of the escapement mechanism, the escapement mechanism is caused to rotate at an undesirable speed which would cause rapid wear of the escapement mechanism and further that recording foil driven by such mechanism would pass rapidly through the recorder. Therefore, it has been found that a torque control device should be located between the drive motor and a clock escapement mechanism in the instrument drive.

It is, therefore, an object of my invention to provide a motor driven, constant torque, instrument drive for a recording instrument or the like, wherein a constant output torque is applied to the instrument drive regardless of voltage fluctuations at the motor input terminals.

A further object of my invention is to provide a constant speed instrument drive for a recording instrument or the like, wherein the recording instrument will continue to operate at a constant rate of speed for a given period of time after power failure.

A further object of my invention is to provide a motor driven constant speed instrument drive which can be utilized with either an A.C. or D.C. motor drive.

Other objects and advantages will become apparent in the following specification and the appended drawings in which:

FIGURE 1 is a side elevational view of the drive assembly;

FIG. 2 is an exploded isometric view of the instrument drive, and;

FIG. 3 is an isometric view of the clock escapement and the recording instrument.

The preferred embodiment of my invention is disclosed in FIGS. 1 and 3, and includes the following combination: a drive assembly 2, a clock escapement mechanism 4, and a recording instrument 6. The drive assembly 2 is an energy storage and transfer device which is connected by a driven gear 65 to gear 114 of the clock escapement mechanism 4, and to gear 117 of the recording instrument 6. The clock escapement mechanism 4 governs the amount of torque applied to the recording instrument 6 and any energy in excess of the required torque is retained and stored by the drive assembly 2.

Referring now to the construction of the drive assembly 2. A base plate 12 supports the drive assembly 2 and has mounted thereon a motor mount 14. The motor mount 14 is secured to the top surface of the base plate 12 as by screws 16 which extend upwardly from its bottom surface. The motor mount 14 extends upwardly away from the top surface of the base plate 12 and is provided with a horizontal mounting flange 18 which supports a motor 20 secured by screws 22 and 24 threaded into tapped holes 26 and 28. The motor 20, as will become apparent further in the specification, may be either an A.C. or D.C. motor.

As will be noted in FIG. 1, the drive shaft 30 of the motor 20 extends downwardly and is provided at its lower end with a pinion 32. The drive shaft 30 and pinion 32 extend into an opening 34 in flange 18 and are positioned in a concave recess 35 in the forward face of the motor mount 14. The concave recess 35 is sufficient to allow free rotation of the drive shaft 30 and also provides clearance for a driven gear 36 with which the pinion 32 is in mesh.

The gear 36 is large enough to permit bearing post 42 to extend therethrough and has integral therewith a hub portion 38. The gear 36 is rotatably mounted about a vertical bearing post 42 which is integral with the base plate 12 and displaced somewhat from the motor mount 14. The bearing post 42 is also provided with an annular shoulder 44 which extends upwardly from the top surface of the base plate 12 and supports the lower surface 37 of the hub 38 when gear 36 is positioned thereon.

An annular ratchet 46 is integral with hub 38 and is provided with a plurality of horizontally positioned, radially disposed teeth 48 which have curved surfaces 50 extending inwardly to a lesser radial dimension. The teeth 48 are equally spaced apart and are provided with sharp vertical edges 52 opposite their curved surfaces.

In FIG. 2, the bearing post 42 has bore 54 extending the length of the axis and is provided with a bearing recess 56 at the upper portion of post 42. The bore 54 extends through the base plate 12 and is surrounded by a recessed bearing shoulder 58 in the bottom surface of the mounting plate 12.

Suitable bearings 60 and 62 are seated in the recessed openings 56 and 58, and surround a driven shaft 64 as set out in FIG. 1. The bore 54 is of sufficient diameter to provide clearance for the shaft 64 so that relatively free rotational movement is provided.

Before proceeding further, it is important to point out that the reduction gear 36 is positioned on the bearing post 42 prior to attachment of the motor mount 14 and the motor 20.

Shaft 64 is provided with recesses 72, 74 and 76 which are spaced apart along the longitudinal axis of the shaft. At the upper end of shaft 64 is an arm 78 secured thereto provided with a downwardly extending portion 80 in which is positioned an opening 82.

Before the shaft 64 is inserted into bore 54, a torsion spring 84 is positioned on, and surrounds the bearing post 42. The lower end 86 of the spring 84 is secured by a screw 88 and a spacer 90 to the gear 36. The shaft 64 is then inserted into the opening 54 and the upper end 91 of the spring 84 is inserted into opening 82 of the arm 78. Snap rings 92, 94 and 96 are then inserted into slots 72, 74 and 76 and retain the shaft 64 and bearings 60 and 62 to the bearing post 42. To complete the drive assembly 2 a gear 65 is secured to the lower end of shaft 64 as by a pin 67. The gear 65 meshes with gear 114 of the escapement mechanism 4, and gear 117 of the recording device 6, to provide the drive therefor.

As stated earlier in the specification the clock escapement mechanism 4 is utilized as a governor to regulate the speed of the recording instrument 6. That is to say, gear 114 will receive from gear 65, in general, only that portion of the applied torque which is sufficient to maintain the constant speed setting of the escapement mechanism 6. Thus gear 65 will drive gear 117 of the recording instrument 6 at a speed commensurate with the setting of the escapement mechanism 4, excess torque supplied by the motor 20 being stored in the drive assembly 2 in a manner to be described later in the specification. The construction of the clock escapement mechanism 4 can be viewed in FIG. 3 where gear 114 drives through gears 116, 118, 120, 122 and 124. Gear 124 is integral with an escapement wheel 128 which is connected through a pallet 126 to a balance wheel 130. A balance spring 132 is connected at one extremity to the balance wheel 130 and at its other extremity to a stationary support 134. Essentially the escapement mechanism 4 oscillates at a constant amplitude and thus governs the amount of speed of gear 65 to gear 117 of the recording instrument.

Referring now to the recording instrument 6. Flight recording instruments such as the one shown in FIG. 3 employ an aluminum foil material on which flight data and flight conditions are recorded or embossed. This information is later analyzed to provide a permanent record of the flight. Aluminum foil has been found to be particularly useful especially a hard aluminum foil adapted to withstand extreme temperatures as might be encountered in a fire resulting from a crash.

In the embodiment shown, a continuous strip of aluminum foil 140 is provided on a rotatably mounted supply spool 142 suported on a base member 143. The foil 140 extends across the forward face of a vertically mounted platen 144 and is connected to a windup spool 146. The windup spool 146 is integral with a shaft 148 to which is secured the driven gear 117 and is rotated clockwise by the shaft when gear 65 of the drive assembly 2 actuates gear 117. Thus the aluminum foil 140 is removed from the supply spool 142 and is wound onto the takeup spool 146 at a rate dependent upon the speed applied to the shaft 148. As the foil 140 moves past the platen 144 a number of styli such as 150 and 152 scribe recordings thereon. The styli 150 and 152 may be actuated by numerous devices. For example stylus 152 is connected to a pressure sensitive bellows 154 for recording altitude while stylus 150 may be actuated by another device (not shown) for indicating time or acceleration, etc.

The recording instrument 6, when used under actual flight conditions, may be operated for a time period of 10 hours. Therefore, the foil supply 140 must be sufficient to fulfill this requirement. Generally, the foil 140 in the present instance is moved past the platen 144 at about 3½ to 5½ inches per hour.

Referring now to the general operation of my invention. The motor 20 is energized to drive pinion 32 and gear 36. As gear 36 is rotated a torque is supplied to the spring 84. When the torque in the spring 84 is sufficient to drive the escapement mechanism 4 the upper end 91 of the spring 84 moves the arm 78 to rotate shaft 64. In the present instance the torque required to drive the escapement 4 is substantially 3 to 5 inch ounces. Thus as the torque in the spring 84 reaches a prescribed amount, shaft 64 turns gear 65 to actuate the escapement 4 and to drive the recording instrument 6.

The escapement mechanism 4, as stated earlier, is essentially a governor or speed regulator. That is, it is designed to operate at a constant speed. This is a well known principle employed in clocks, and, therefore, further elaboration will not be presented.

The amount of torque supplied by the motor in the previously described gearing arrangement is more than sufficient to drive the escapement 4 and the recording instrument 6. Therefore, the excess energy is stored in the spring 84 in the following manner.

The escapement mechanism 4 accepts from the driven gear 65 on the shaft 64 only a limited amount of power. The excess power is first stored by winding the spring 84 until it begins to tighten around bearing post 42. Further tightening by brake action prevents the motor from applying excessive torque to shaft 64 which in turn prevents the excessive torque from reaching the escapement mechanism, the spring 84 receiving from gear 36 a greater torque at its lower end 86 so that, in effect, escapement 4 tends to reduce the speed at which shaft 64 would be driven. Thus, since a greater torque is being received by the spring 84 than is being utilized, the excess energy is stored in the spring 84.

The wide diameter and the spring rate of spring 84 and diameter of bearing post 42 provide that upon tightening of the spring a predetermined amount of energy will be stored in the spring before it is tightly wound around the bearing post 42. When the spring 84 is tightly wound on post 42 the motor 20 is stalled. However, from the tightly wound spring 84 the drive shaft 64 is rotated by the upper end 91 of the spring 84 to drive the escapement 4 and the recording instrument 6. The motor 20 remains stalled only so long as the spring 84 is wound tightly around the bearing post 42. When the drive shaft 64 has caused to remove a substantial amount of torque from the spring 84 the motor 20 is no longer stalled, but is allowed to again drive escapement 4 and instrument 6 through spring 84.

Also should the power fail, the spring 84 utilizes the stored energy to drive shaft 64 until the stored energy is depleted.

Where the motor 20 has been stalled, spring 84 does not completely unwind before the motor is again operative, for it is only necessary to release that amount of energy from the spring to allow its motor to drive through spring 84 again.

Upon power failure, there would be a tendency for the spring 84 to unwind itself through drive shaft 30 of motor 20, as there would be nothing to retard the rotation of shaft 30. To prevent unwinding spring 84 through shaft 30, a pawl arm 100 is secured to motor mount 14 by screw 98.

The pawl arm 100 has a curved end 102 which engages ratchet 46. The end 102 rides over the surface 50 of ratchet teeth 48. However, when power for the motor 20 fails, edge 104 of pawl arm 100 engages face 52 of the nearest ratchet tooth to prevent the spring 84 from unwinding through motor shaft 30, but rather allows the spring 84 to unwind only through shaft 64.

I have, in the specification and the appended drawings, presented a detailed disclosure of the preferred embodiments of my invention. It is to be understood that the invention is susceptible to modifications, structural changes and various applications of use within the spirit and scope of the invention, and I do not intend to limit the invention to the specific form disclosed but cover all modifications, changes, and alternate constructions, and methods falling within the scope of the appended claims.

Now, therefore, I claim:

1. In an instrument drive for constant speed and reserve energy storage, a base plate provided with an integral tubular bearing post projecting perpendicularly with respect to the general plane of the plate, an electric motor supported in a spaced, fixed relationship relative to one side of said plate having a drive pinion residing adjacent to said plate and in a plane parallel thereto, a driven gear loosely encircling said tubular post and enmeshed with said drive pinion, an elongated coil spring encircling said tubular post and having one end attached to said driven gear, a shaft journaled in said tubular post having one end thereof projecting from said post and the other end extending through said base plate so as to project from the other side of said plate, an arm on said one end of the shaft engaging the other end of said spring, a gear on said other end of said shaft, a chart drive means coupled to said last mentioned gear, and an escapement also coupled to said last mentioned gear.

2. The combination set forth in claim 1 including a ratchet integral with said gear that loosely encircles the tubular post and disposed adjacent the base plate, and a resilient pawl extending parallel to said base plate into engagement into said ratchet.

References Cited in the file of this patent

UNITED STATES PATENTS

| | | |
|---|---|---|
| 1,530,259 | Hall | Mar. 17, 1925 |
| 1,779,707 | Jarvis | Oct. 28, 1930 |

FOREIGN PATENTS

| | | |
|---|---|---|
| 442,252 | Germany | Mar. 7, 1929 |
| 901,965 | France | Nov. 20, 1944 |